to remove and replace the body member from the fishing line.

United States Patent [19]
Scott

[11] 3,740,889
[45] June 26, 1973

[54] FISHING LURE
[76] Inventor: Blayney J. Scott, 306 Dallas Road, Victoria, British Columbia, Canada
[22] Filed: Apr. 2, 1971
[21] Appl. No.: 130,576

[30] Foreign Application Priority Data
June 4, 1970 Canada .................................. 084627

[52] U.S. Cl. ................ 43/42.09, 43/42.28, 43/42.36
[51] Int. Cl. .......................................... A01k 85/00
[58] Field of Search ........................ 43/42.09, 42.28, 43/42.36

[56] References Cited
UNITED STATES PATENTS
2,161,094  6/1939  Saunders, Jr. ................ 43/42.28 X
567,310   9/1896  Gaide ................................ 43/42.28
2,255,793 9/1941  Kridler ......................... 43/42.28 X
2,365,502 12/1944 Weesner ........................... 43/42.28

Primary Examiner—Antonio F. Guida
Assistant Examiner—Daniel J. Leach
Attorney—Brian J. Wood

[57] ABSTRACT

A fishing lure having a substantially frustoconical body member tapering to a bulbous head portion connectable to a fishing line and a resilient sleeve having a snap fit over the bulbous head portion and a snug fit on the body member for releasably clamping a skirt member to the body member so that the skirt member can be removed and replaced without disconnecting the body member from the fishing line.

3 Claims, 3 Drawing Figures

PATENTED JUN 26 1973
3,740,889
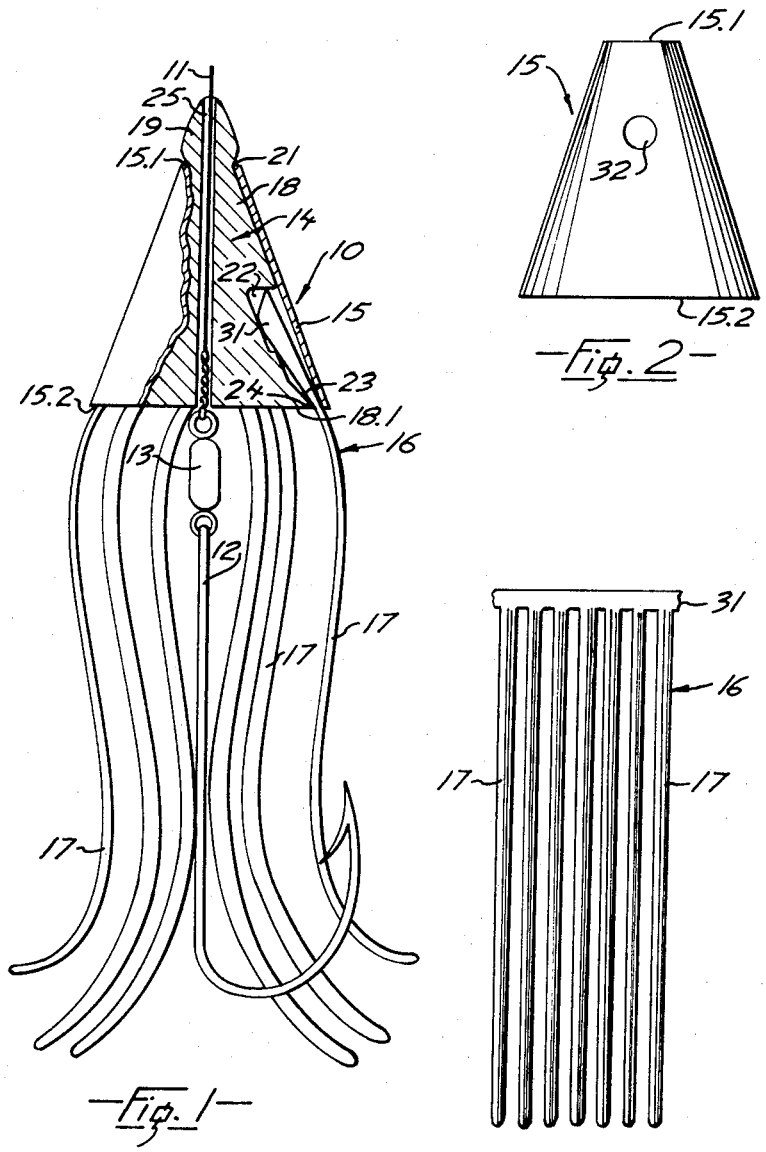
Fig. 1
Fig. 2
Fig. 3
Blayney J. Scott,
Inventor
by 
Lyle G. Trorey,
Agent

FISHING LURE

BACKGROUND OF THE INVENTION

1. Field of the Invention

This invention relates to fishing lures.

2. Prior Art

Many lures particularly those that are used by commercial trollers, are generally constructed so that they can be slidably mounted on a leader which has a hook at one end and which is connected at its other end to a fishing line. Snaps and swivels are generally used to connect the hook to the leader, the swivels serving as stops to prevent the lures from sliding off the leaders and to prevent the leaders from being twisted. Drag applied to the hook by a hooked fish, therefore, is transferred directly from the hook to the line so that the lure does not take the weight of the fish.

Due to change in light and feed conditions it is generally necessary to change such lures frequently. In order to change prior art lures, as above described, it is usually necessary to cut the leader just above the hook so that the lure can be removed and replaced with another of a different color or shape and the hook then resecured on the leader. This takes considerable time and, further, shortens the leader so that leaders have to be replaced frequently.

SUMMARY OF THE INVENTION

The present invention provides a fishing lure the appearance of which can be altered while it is in place on a leader without the necessity of disconnecting the hook, thus eliminating the necessity of either cutting or untying the leader.

The lure of the present invention includes a body member securable to a leader of a fishing line, a flexible skirt member adapted to be wrapped, circumferentially, about the body member and a circumferentially disposed clamp member clamping the skirt member to the body member, said clamp member being releasably locked on the body member so that the skirt member can be secured to or detached from the body member without disconnecting the body member from the leader.

DESCRIPTION OF THE DRAWINGS

FIG. 1 is a side view of a lure of the invention partially fragmented for clarity of illustration, FIG. 2 is a side view of a clamp member, FIG. 3 is a side view, partially fragmented, of a skirt member.

DETAILED DESCRIPTION

FIG. 1

Referring to the drawings, FIG. 1 shows a lure, generally 10, which is secured, in a known manner, to a leader 11 of a fishing line, not shown, the leader having a fish hook 12 secured thereto by a swivel 13.

The lure has a substantially conical body member 14 which is adapted to be mounted on the leader 11 just ahead of the swivel 13, and a clamping member 15 which has a snug fit on the body member and which is releasably locked thereon. A skirt member 16 is clamped between the body member and the clamping member and has streamers 17 which trail aft of the body member so as to camouflage the hook when the lure is trolled.

The body member 14 has a substantially frusto-conical core portion 18 which tapers from a base 18.1 to a bulbous head portion 19 providing a neck 21. The core portion 18 has a circumferentially extending groove 22 which terminates at a lower outwardly sloped shoulder 23 intersecting the base 18.1 so as to provide a sharp gripping edge 24. An axial passage 25 having a diameter sufficient to enable the leader 11 to be threaded therethrough extends through both the core portion 18 and head portion 19.

FIGS. 1 and 2

The clamping member 15 is a frusto-conical sleeve having a small end 15.1 and a large end 15.2 and which is formed of a resilient material such as a suitable thermoplastic and has a length the same as a length of a core portion 18. Inside diameter of the small end 15.1 of the sleeve is the same as diameter of the core portion 18 at the neck 21 and inside diameter of the large end 15.2 is the same as diameter of the base of the core portion 18.

The clamping member and body member are joined by forcing the clamping member over the bulbous head. The small end clamping member is thus required to stretch in order to accommodate the bulbous head portion, thus effecting a substantially snap fit thereover. It is seen, FIG. 1, that the clamping member has a substantially snug fit on the core portion 18 of the body and covers the groove 22.

FIG. 3

The skirt member is made of a suitable flexible and elastic material such as rubber or suitable thermoplastic, the streamers 17 extending from a transverse bead 31. The bead and streamers can be molded as an integral unit.

The skirt member, see FIG. 1, is wrapped around the core portion 18 of the body member 14 with the bead lying in the groove 22, the streamers being gripped between the clamping member and the gripping edge 24 of the core. Due to the sloped shoulder 23 the streamers tend to bow outwardly away from the core portion 18 so that when the lure is trolled through water the streamers resemble tenticles of a squid. Resemblance of the lure to a squid can be heightened by making the body member and clamping member of different colors and providing a pair of small apertures 32 in the clamping member so that the clamping member resembles the head of a squid, the apertures resembling eyes, FIG. 2.

The skirt member can be replaced with another of different color and shape by simply shoving the clamping member over the bulbous head portion of the body member, applying the new streamer member, then reapplying the clamping member, thus obviating the necessity of cutting or untying the leader as is common with lures of this type.

It is to be understood that although the clamping member and core portion have been described as having a truncated conical shape, other shapes can be adopted. For instance the core portion can be egg-shaped or diamond-shaped, the clamping member having sufficient resiliency to obtain a snug intimate fit thereon. It is also apparent that the skirt member instead of having a plurality of streamers can be formed as a continuous flexible skirt.

I claim:

1. A fishing lure including:

a. a body member adapted to be connected to a fishing line ahead of a hook, the body member having a core portion tapering towards a bulbous head portion,
b. a flexible skirt extending circumferentially around the body member so as to camouflage the hook,
c. a resilient clamping member having a snug fit on the core portion and a snap fit over the bulbous head portion so as releasably to lock the skirt on the body member.

2. A fishing lure according to claim 1 in which the clamping member is a resilient frustoconical sleeve.

3. A fishing lure according to claim 2, the body member having an axial passage for receiving the fishing line.

* * * * *